United States Patent
Alexander

(10) Patent No.: US 10,848,200 B2
(45) Date of Patent: Nov. 24, 2020

(54) FREQUENCY HOPPING SPREAD SPECTRUM COMMUNICATION IN MESH NETWORKS

(71) Applicant: TEXECOM LIMITED, Haslingden (GB)

(72) Inventor: Peter Alexander, Todmorden (GB)

(73) Assignee: TEXECOM LIMITED, Haslingden (GB)

(*) Notice: Subject to any disclaimer, the term of this patent is extended or adjusted under 35 U.S.C. 154(b) by 0 days.

(21) Appl. No.: 16/470,487

(22) PCT Filed: Dec. 19, 2017

(86) PCT No.: PCT/GB2017/053818
§ 371 (c)(1),
(2) Date: Jun. 17, 2019

(87) PCT Pub. No.: WO2018/115854
PCT Pub. Date: Jun. 28, 2018

(65) Prior Publication Data
US 2020/0014421 A1  Jan. 9, 2020

(30) Foreign Application Priority Data

Dec. 21, 2016  (GB) .................................. 1621881.0

(51) Int. Cl.
*H04B 1/713* (2011.01)
*H04W 52/02* (2009.01)
(Continued)

(52) U.S. Cl.
CPC ........ *H04B 1/713* (2013.01); *H04W 52/0216* (2013.01); *H04W 56/002* (2013.01); *H04W 56/005* (2013.01); *H04W 84/18* (2013.01)

(58) Field of Classification Search
CPC ................ H04B 1/713; H04W 56/002; H04W 52/0216; H04W 84/18; H04W 56/005
(Continued)

(56) References Cited

U.S. PATENT DOCUMENTS

| 7,421,257 B1 | 9/2008 | Elliott |
| 2005/0213612 A1 | 9/2005 | Pister |

(Continued)

FOREIGN PATENT DOCUMENTS

| EP | 2107849 A1 | 10/2009 |
| EP | 2581891 A2 | 4/2013 |
| WO | 2011/009646 A1 | 1/2011 |

OTHER PUBLICATIONS

International Search Report and Written Opinion for PCT/GB2017/053818 dated Jul. 16, 2018; 21 pages.

*Primary Examiner* — Don N Vo
(74) *Attorney, Agent, or Firm* — Schwabe Williamson & Wyatt, PC

(57) ABSTRACT

A mesh network comprises a controller and a plurality of mesh-networked devices, operable to communicate with the controller. The controller and the plurality of mesh-networked devices comprise timing units, and are operable to communicate in accordance with a frequency hopping sequence. The mesh-networked devices switch between a transmit mode, in which they are capable of transmitting messages to one or more other mesh-networked device and/or the controller and an inactive mode, in which they are unable to transmit to or receive messages from one or more other mesh-networked devices or the controller. The timing units of the mesh-networked devices are synchronised and the mesh-networked devices are operable to switch to the transmit mode at pseudorandom time intervals.

20 Claims, 8 Drawing Sheets

(51) Int. Cl.
*H04W 56/00* (2009.01)
*H04W 84/18* (2009.01)

(58) Field of Classification Search
USPC .................................................. 375/132–137
See application file for complete search history.

(56) References Cited

U.S. PATENT DOCUMENTS

| | | | |
|---|---|---|---|
| 2006/0239333 A1 | 10/2006 | Albert | |
| 2007/0132846 A1* | 6/2007 | Broad | G08B 25/10 348/143 |
| 2007/0258508 A1* | 11/2007 | Werb | H04W 84/18 375/140 |
| 2008/0040509 A1 | 2/2008 | Werb | |
| 2009/0097531 A1 | 4/2009 | Franceschini | |
| 2010/0202327 A1* | 8/2010 | Mushkin | H04B 1/713 370/280 |
| 2011/0310770 A1 | 12/2011 | Liang | |
| 2013/0016757 A1 | 1/2013 | Hui | |
| 2013/0016759 A1 | 1/2013 | Hui | |
| 2013/0181848 A1 | 7/2013 | Picard | |
| 2013/0322341 A1 | 12/2013 | Nelson | |
| 2015/0208320 A1* | 7/2015 | Alexander | H04W 40/246 370/254 |
| 2016/0037426 A1* | 2/2016 | Li | H04W 36/0094 370/332 |
| 2016/0112090 A1* | 4/2016 | Mason, Jr. | H04B 1/7156 375/134 |
| 2016/0269074 A1 | 9/2016 | Picard | |
| 2017/0299633 A1 | 10/2017 | Pietrowicz | |

* cited by examiner 10 channel example Ricochet FHSS System

FREQUENCY HOPPING SPREAD SPECTRUM COMMUNICATION IN MESH NETWORKS

CROSS-REFERENCE TO RELATED APPLICATION

The present application is a national phase entry under 35 U.S.C. § 371 of International Application No. PCT/GB2017/053818, filed Dec. 19, 2017, which designates the United States of America, which claims priority to GB Application No. 1621881.0, filed Dec. 21, 2016, the entire disclosures of each of these applications are hereby incorporated by reference in their entireties and for all purposes.

TECHNICAL FIELD OF THE INVENTION

The present invention relates to frequency hopping spread spectrum (FHSS) communication in mesh networks. In particular the invention relates to a method of synchronising mesh networks to use FHSS communication and especially to a method of synchronising mesh networks to use FHSS communication in battery powered and/or wireless mesh networks, such as alarm systems.

BACKGROUND TO THE INVENTION

Point to point wireless communications are inherently unreliable. Atmospheric conditions, obstructing media and external interference are all subject to change which can attenuate or inhibit the wireless communication path. A proven way to mitigate these factors is to form a mesh network where alternative paths are provided for any device should the primary path fails.

The main drawback of such an approach is all devices must be capable of receiving messages as well as transmitting so the current consumption can increase. To reduce this effect, a method of time synchronising both transmission and reception so that the time spent in the active states is kept to a minimum is set out in WO2011/009646 (Texecom).

In a true battery powered mesh network, all nodes forward (i.e. receive and send on) messages, rather than only locally powered nodes forwarding messages, and battery powered nodes playing no part in the forwarding of messages. In this case, it is necessary for all nodes to wakeup periodically to check for a transmitter preamble. In order to keep power usage as low as possible, this need to happen very quickly; if there is no preamble to receive, the receiver must be shut off as quickly as possible to conserve battery life.

In the system of WO2011/009646, a single hub or "control device" communicated with a number of security devices, the security devices are synchronised to switch to the activated state for typically 18 ms once every 0.5 seconds and to remain in the activated state to communicate with each other and transfer data.

Frequency Hopping Spread Spectrum (FHSS) is a method of radio communication involving switching the carrier through many frequency channels in a sequence known to both the transmitter and receiver.

The main advantage of this is a much better resistance to narrowband interference than single channel systems. If one of the channel is being used or blocked, the FHSS system can hop to the next channel. FHSS systems are also very good at sharing bandwidth with other systems and do not adding significant noise to channels not being used.

The dwell time in any channel ranges from a few bits within a packet (microseconds) to several hundred milliseconds. Some systems transmit short packets occupying a single channel while others transmit longer packets which are spread over many channels.

Approvals bodies worldwide, including FCC in the USA, often allow higher power transmissions in systems that employ FHSS using a high number of (over 50) channels.

One challenge associated with any FHSS system is the synchronisation of the transmitter and the receiver.

One way of achieving this is to have a guarantee that the transmitter will use all the channels during the preamble in a fixed period of time. The receiver can then find the transmitter by picking a random channel and listening for the preamble on that channel. While this works, it requires both a long preamble from the transmitter and also the receiver to be active for a significant period of time in order to guarantee hearing the transmitter.

Alternatively, the receiver can cycle through the channels in order to pick out a transmitter preamble on a single channel but this is subject to the same drawback.

Neither of these methods of FHSS synchronisation would be suitable in a battery powered mesh network. In a 50 channel system, for example, each receiver would need to spend 50 times longer in receive each time it was searching for a preamble which would have a catastrophic effect on battery life.

In consequence, FHSS has been considered inappropriate for mesh networks with battery powered nodes, and indeed even for locally powered nodes, if low-power operation is desirable.

FHSS can be useful in situations where security is important, because data is sent over different channels, so listening/blocking devices cannot simply block the one channel on which data is transferred (unlike single-channel systems). However, especially where a FHSS system moves consecutively through channels, such listening/blocking devices can determine the hopping sequence and block/listen to the correct channel by switching channels each time data ceases to be received on the channel which is being listened to.

This could be overcome by switching between channels to a pseudorandom new channel. Pseudorandom sequences satisfy one or more statistical tests for randomness but are in fact produced by a definite mathematical procedure. It can be difficult to set up networked devices to follow the same pseudorandom sequence, especially when new devices join the network at different times in the sequence.

This invention aims to obviate, ameliorate, or mitigate one or more of the aforesaid problems of high power use when listening for a message and difficulty in providing a secure network, and/or to provide improved mesh networks/methods/devices.

SUMMARY OF THE INVENTION

According to a first aspect of the invention, there is provided a mesh network comprising a controller and a plurality of mesh-networked devices, operable to communicate with the controller; the controller and the plurality of mesh-networked devices comprising timing units, and being operable to communicate in accordance with a frequency hopping sequence; wherein the mesh-networked devices are operable to switch between a transmit mode, in which they are capable of transmitting messages to one or more other mesh-networked device and/or the controller and an inactive mode, in which they are unable to transmit to or receive messages from one or more other mesh-networked devices or the controller; wherein the timing units of the mesh-networked devices are synchronised and the mesh-networked devices are operable to switch to the transmit mode at time intervals having a pseudorandom component.

Time intervals having a pseudorandom component are described hereinafter as "pseudorandom time intervals" and may be made up of a fixed component (i.e. a period of fixed length) and a pseudorandom component (i.e. a period having a variable length that satisfied one or more statistical test for randomness, but is in fact produced by a definite mathematical procedure), which is added to (or deducted from) the fixed component. Alternatively, the pseudorandom time intervals may be entirely composed of a pseudorandom component, but set between certain threshold values.

FHSS systems are more difficult to intercept, especially in real-time, than single channel systems, and by switching states at pseudorandom time intervals, and switching between channels in accordance with the frequency hopping sequence, it is even more difficult for a hacker to intercept the signals, and especially hard for a hacker to send false signals, e.g. to disarm a system, since the pseudorandom nature of the time of switching makes it unknown to the hacker when the next transmission/reception will be, and unknown which channel it will be in.

The mesh-networked devices may be operable to switch between the transmit mode, the inactive mode and a receive mode, in which they are capable of receiving messages from one or more other mesh-networked device and/or the controller. The mesh networked devices may be operable to switch to the receive mode in accordance with the frequency hopping sequence.

The pseudorandom time intervals may be, on average, at least 30 seconds, at least one minute, at least 2 minutes, at least 10 minutes or at least 15 minutes.

The pseudorandom time intervals may have minimum threshold values and maximum threshold values. The average pseudorandom time interval may be the mean of the minimum threshold value and the maximum threshold value.

The pseudorandom time intervals may have a fixed time component and a pseudorandom time component (which could be positive or negative). The average time interval may be the average pseudorandom time component plus the fixed time component. If the pseudorandom time component is generated so as to be pseudorandomly positive or negative, over time it will increase or decrease the fixed value by about the same amount, so, on average, the pseudorandom time interval will be equal to the fixed time component.

The pseudorandom time intervals may be synchronised to occur when other mesh network devices are in the receive mode.

The mesh-networked devices may switch to the receive mode each time they change frequency channel.

The time in each channel in the frequency hopping sequence, or "channel time", may be identical, or the channel time may be different for different channels. Spending an identical time in each channel can be the best use of resources, as the maximum time period can be spent in each channel, and over time achieves an even spread across all the channels. On the other hand, spending different amounts of time in each channel can make it more difficult for a hacker to determine the sequence, even if the sequence is cyclic. The channel time may be no more than 1 second, no more than 0.5 seconds, or no more than 0.25 seconds.

The channel time may be substantially shorter than the average pseudorandom time interval, for example at least 10 times shorter, at least 50 times shorter, at least 100 times shorter, or at least 200 times shorter.

This arrangement, whereby the timing units are synchronised, and a frequency hopping sequence is followed means that no extra time needs to be spent synchronising the devices in the frequency domain, as they are already synchronised in the time domain.

The plurality of mesh-networked devices may be operable to switch to the receive mode and remain in a receive mode for a first predetermined "wake-up" period, and if no message is received within that period, to return to the inactive mode.

The first predetermined "wake-up" period may be short, e.g. less than 0.1 s, less than 0.05 s, or less than 0.02 s, less than 1 ms, less than 0.5 ms, or less than 0.25 ms.

The plurality of mesh-networked devices may be operable to switch to the receive mode and remain in a receive mode for a first predetermined "wake-up" period, and if a message is received within that period, to remain in an active (receive, or transmit) mode for a second predetermined "message forwarding" period.

The second predetermined "message forwarding" period may be longer than the first predetermined wake-up period. The second predetermined message forwarding period may be sufficiently long to receive and then forward a message. The plurality of mesh-networked devices may be operable to forward messages where the messages contain instructions to do so. The second predetermined "message forwarding" period may be sufficiently long to receive and forward a message to another device, and to receive and forward an acknowledgement from said other device. The plurality of mesh-networked devices may be operable to receive and forward a message to another device, and to receive and forward an acknowledgement from said other device during the second predetermined "message forwarding" period.

The second predetermined "message forwarding" period may be less than 0.5 s, less than 0.2 s, or less than 0.05 s. The first predetermined "wake-up" period and the second predetermined "message forwarding" period may, in total be no more than 1 second, or no more than 0.5 seconds.

This arrangement (in which the timing units of the devices are synchronised, and they follow a frequency hopping sequence) allows mesh-networked devices to wake up, listen briefly on the channel on which any transmissions would be received, and if no such transmission is received, to return to the low-power inactive mode. The fact that the mesh-networked devices are operable to communicate in accordance with a frequency hopping sequence, and switch to the transmit mode according to a pseudorandom time sequence, means that the use of the channels is pseudorandom The frequency hopping sequence may be cyclic, the frequency hopping sequence may be cyclic and consecutive, hopping to the next consecutive channel (up or down) after a predetermined time interval.

Alternatively, the frequency hopping sequence may be cyclic, but not consecutive, not necessarily switching from one channel to the next frequency channel up or down, but always following the same sequence from one channel to the next predetermined channel (e.g. always moving to channel 4 from channel 1).

The cycle of the frequency hopping sequence may be shorter than the pseudorandom component of the pseudorandom time interval.

The frequency hopping sequence could itself be pseudorandom (in which case each mesh-network device would have to follow the same pseudorandom sequence at the same time).

A pseudorandom frequency hopping sequence makes it very difficult for a hacker, but it also makes it difficult for devices to synchronise. Following a cyclic sequence and relying on the pseudorandom time intervals makes synchronisation more straightforward.

The plurality of mesh-networked devices may follow the same frequency hopping sequence at the same time.

All the mesh-networked devices in the mesh network may follow the same frequency hopping sequence at the same time.

The controller may comprise a master clock and the mesh-networked devices may synchronise their timing units to the master clock.

The mesh-networked devices and optionally the controller, may be operable to send acknowledgement messages comprising the current frequency channel and time left in the channel. This aids synchronisation, since once the channel and the time left in the channel is known, a device knows where it is in the cycle through the channels.

The mesh-networked devices may be operable to receive acknowledgement messages comprising the current frequency channel of a sending device and the time left in that channel and may compare that to their current channel to detect lack of synchrony with the sending device. The mesh networked devices may be operable to correct their clock and/or the timing of their frequency hopping based on the comparison with data in the acknowledgement message.

The mesh-networked devices may achieve the switching to the transmit mode at pseudorandom time intervals by switching to the transmit mode according to a pseudorandom time sequence.

The mesh-networked devices may all switch to the transmit mode according to the same pseudorandom time sequence.

The mesh-networked devices may additionally switch to the transmit mode when instructed to forward a message by another mesh-networked device, or the controller. This in effect is still pseudorandom, since the instructions to forward a message will be based on a pseudorandom transmission from the other mesh networked device or the controller.

The mesh networked devices may be battery powered.

The mesh network may be an alarm network.

The mesh networked devices may comprise sensors.

The mesh networked devices and optionally the controller may be operable to only send data packets short enough to fit within a single channel, e.g. less than 0.5 s, less than 0.1 s, or less than 50 ms, when they are synchronised. Devices that are not yet synchronised to the mesh network, may send longer data packets, in order to assist joining the mesh network.

The plurality of mesh-networked devices, may be operable to communicate in accordance with a frequency hopping sequence; wherein the mesh-networked devices are arranged to switch to a receive mode for a first predetermined "wake-up" period and optionally remain active (i.e. in a receive or transmit mode) for a second predetermined "message forwarding" period in a channel according to the sequence and switch to a receive mode for a third predetermined "acquisition-check" period and optionally remain active (i.e. in a receive or transmit mode) for a fourth predetermined "pairing" period in at least one other predetermined acquisition channel. The acquisition channel may be a channel specifically used to add or "pair" devices to the mesh-network. Thus, each time a mesh-networked device switches to an active mode, it may be operable to first listen for any messages in the channel according to the frequency hopping sequence, and if a message is received, remain active to transfer it, and optionally forward on an acknowledgement; then, once the first predetermined "wake-up" period has passed (and optionally the second predetermined "message forwarding" period, if a message is received, has passed) the device may be operable to switch to the acquisition channel for a third predetermined "acquisition-check" period.

The third predetermined "acquisition-check" period may be short, e.g. less than 0.1 s, less than 0.05 s, or less than 0.02 s, less than 1 ms, less than 0.5 ms, or less than 0.25 ms.

If no message is received on the acquisition channel during the third predetermined "acquisition-check" period, the mesh-networked device may return to the inactive mode. If a message is received from an unsynchronised device, it can remain active in the fourth predetermined "pairing" period and provide data to the unsynchronised device so that the unsynchronised device can join the mesh network.

The fourth predetermined "pairing" period may be less than one second, 0.5 s, less than 0.2 s, or less than 0.05 s. The first predetermined "wake-up" period, the second predetermined "message forwarding" period, the third predetermined "acquisition-check" period and the fourth predetermined "pairing" period may, in total be no more than 1 second, or no more than 0.5 seconds. This can allow synchronisation, or the transmission of a message to the controller and back to occur in a single channel. Of course, it is also possible for the synchronisation or transmission and acknowledgement to occur over a longer period in more than one channel.

The mesh-networked devices may be operable to request to join the network and to request data comprising the current channel in the frequency hopping sequence and the time left in that channel.

The mesh-networked devices may be operable to transmit data (optionally in response to a request) comprising the current channel in the frequency hopping sequence and the time left in that channel to an unsynchronised device. This allows the unsynchronised device to join the mesh-network and become a mesh-networked device as it can follow the frequency hopping sequence and become time-synchronised with the mesh-networked devices. It can also help synchronised devices remain in-sync.

An unsynchronised device may be a new device, e.g. a new sensor being added to an alarm network, or an existing device that has become unsynchronised and re-joins the network, for example, a battery powered device that has had its battery replaced.

Using an acquisition channel doubles the length of time that mesh-networked devices remains active if no messages are received. However, this doubling is much less time than would be required if the devices were to cycle through every channel in receive mode looking for messages from unsynchronised devices, or remain active long enough each time to pick up a preamble from an unsynchronised device cycling through every channel in transmit mode, to ensure a connection.

According to a second aspect of the invention, there is provided a mesh-networkable device for use in a mesh network comprising a controller and a plurality of mesh-networked devices, operable to communicate with the controller; mesh-networkable device comprising a timing unit, and being operable to communicate in accordance with a frequency hopping sequence; wherein the mesh-networkable device is operable to switch between a transmit mode, in it is are capable of transmitting messages to one or more other mesh-networked device and/or the controller and an inactive mode, in which it is unable to transmit to or receive messages from one or more other mesh-networked devices or the controller; wherein the mesh-networkable device is operable to synchronise its timing unit to the mesh-networked devices (and/or the controller) and operable to switch to the transmit mode at pseudorandom time intervals.

The mesh-networkable device according to the second aspect of the invention may comprise any of the features of the first aspect of the invention.

According to a third aspect of the invention, there is provided a controller for controlling mesh-networked devices in a mesh network; the controller comprising a timing unit, and being operable to communicate in accordance with a frequency hopping sequence; wherein the mesh-networked devices are operable to switch between a transmit mode, in which they are capable of transmitting messages to one or more other mesh-networked device and/or the controller and an inactive mode, in which they are unable to transmit to or receive messages from one or more other mesh-networked devices or the controller; wherein the controller is operable to synchronise the timing units of the mesh-networked devices to its timing unit such that the mesh-networked devices are operable to switch to the transmit mode at synchronised pseudorandom time intervals.

The controller may be operable to transmit messages comprising data including the length of time left in the channel in the frequency hopping sequence.

The controller may be operable to transmit messages comprising data including the current channel in the frequency hopping sequence.

The controller may comprise any of the features described in relation to the first aspect of the invention.

According to a fourth aspect of the invention, there is provided a method of operating a mesh-networked device to transmit data in a mesh network comprising a controller and a plurality of mesh-networked devices, operable to communicate with the controller; the method comprising communicating in accordance with a frequency hopping sequence; whereby the mesh-networked device switches between a transmit mode, in which it is capable of transmitting messages to one or more other mesh-networked device and/or the controller and an inactive mode, in which it is unable to transmit to or receive messages from one or more other mesh-networked devices or the controller; the method further comprising synchronising a timing units of the mesh-networked device with timing units of other mesh-networked devices and/or the controller and comprising switching to the transmit mode at pseudorandom time intervals.

The method may comprise switching between the transmit mode, the inactive mode and a receive mode, in which the mesh networked device is capable of receiving messages from one or more other mesh-networked device and/or the controller. The method may comprise switching to the receive mode in accordance with the frequency hopping sequence.

The pseudorandom time intervals may be, on average, at least 30 seconds, at least one minute, at least 2 minutes, at least 10 minutes or at least 15 minutes.

The method may comprise transmitting at pseudorandom time intervals which are be synchronised to occur when other mesh network devices are in the receive mode. This may be achieved by calculating the pseudorandom time intervals such that they are always a multiple of the length of time spent in each channel, such that they always end when the channel changes (if the mesh-networked devices always receive when the channel changes). Alternatively, the pseudorandom time interval need not be a multiple of the length of time spent in each channel, but the device may wait for a pseudorandom time interval, then further delay transmission until the other mesh networks are in a receive mode.

The method may comprise switching to the receive mode each time the frequency channel changes according to the frequency hopping sequence.

The time in each channel in the frequency hopping sequence may be identical, or the amount of time in each channel may be different for different channels. Spending an identical time in each channel can be the best use of resources, as the maximum time period can be spent in each channel; over time, it also achieves a good spread across the frequency spectrum. The time in each channel may be no more than 1 second, no more than 0.5 seconds, or no more than 0.25 seconds.

The time in each channel may be substantially shorter than the average pseudorandom time interval, for example at least 10 times shorter, at least 50 times shorter, at least 100 times shorter, or at least 200 times shorter.

The method may comprise switching to the receive mode and remaining in a receive mode for a first predetermined "wake-up" period, and if no message is received within that period, returning to the inactive mode.

The first predetermined "wake-up" period may be short, e.g. less than 0.1 s, less than 0.05 s, less than 0.02 s, less than 1 ms, less than 0.5 ms, or less than 0.25 ms.

The method may comprise switching to the receive mode and remaining in the receive mode for a first predetermined "wake-up" period, and if a message is received within that period, remaining in an active (receive, or transmit) mode for a second predetermined "message forwarding" period.

The second predetermined "message forwarding" period may be longer than the first predetermined "wake-up" period. The second predetermined "message forwarding" period may be sufficiently long to receive and then forward a message. The method may comprise forwarding messages from one mesh-networked device and/or the controller to another mesh-networked device and/or the controller where the messages contain instructions to do so. The second predetermined "message forwarding" period may be sufficiently long to receive and forward a message to another device, and to receive and forward an acknowledgement from said other device. The method may comprise receiving and forwarding a message to another device, and to receive and forward an acknowledgement from said other device.

The second predetermined "message forwarding" period may be less than 0.5 s, less than 0.2 s, or less than 0.05 s. The first predetermined "wake-up" period and the second predetermined "message forwarding" period may, in total be no more than 0.5 seconds, or no more than one second.

The method may comprise waking up, listening briefly on the channel on which any transmissions would be received, and if no such transmission is received, returning to the (low-power) inactive mode.

The method may comprise cycling through the channels in accordance with the frequency hopping sequence, and may comprise cycling through the channels consecutively, hopping to the next consecutive channel (up or down) after a predetermined time interval.

The mesh-networked device may follow the same frequency hopping sequence at the same time as other (optionally all other) devices in the mesh network.

The method may comprise synchronising the timing unit of the mesh-networked device to a master clock, which may be provided in the controller.

The method may comprise sending acknowledgement messages comprising the current frequency channel and time left in the channel.

The method may comprise receiving one or more acknowledgement messages comprising the current frequency channel of a sending device and the time left in that channel, compare that to the time left in the current channel to detect lack of synchrony with the sending device. The method may comprise correcting an internal timing unit and/or the timing of their frequency hopping based on the comparison with data in the acknowledgement message.

The method may comprise switching to the transmit mode according to a pseudorandom time sequence.

The method may comprise switching to the transmit mode according to the same pseudorandom time sequence as other mesh network devices in the mesh network.

The method may comprise additionally switching to the transmit mode when instructed to forward a message by another mesh-networked device, or the controller. This in effect is still pseudorandom, since the instructions to forward a message will be based on a pseudorandom transmission from the other mesh networked device or the controller.

The mesh-networked device may be battery powered.

The mesh-network device may be an alarm device

The mesh-networked device may comprise one or more sensors.

The method may comprise only sending data packets short enough to fit within a single channel, e.g. less than 0.5 s, less than 0.1 s, or less than 50 ms, when the mesh networked devices are synchronised.

The method may comprise switching to a receive mode for a first predetermined "wake-up" period and optionally remaining active (i.e. in a receive or transmit mode) for a second predetermined "message forwarding" period in a channel according to the sequence and switching to a receive mode for a third predetermined "acquisition-check" period and optionally remaining active (i.e. in a receive or transmit mode) for a fourth predetermined "pairing" period in at least one other predetermined acquisition channel.

The acquisition channel may be a channel specifically used to add devices to the mesh-network. Thus, the method may comprise, each time a mesh-networked device switches to an active mode, first listening for any messages in the channel according to the frequency hopping sequence, and if a message is received, remaining active to transfer it, and optionally forward on an acknowledgement; then, once the first predetermined "wake-up" period has passed (and optionally the second predetermined "message forwarding" period, if a message is received, has passed) switching to the acquisition channel for a third predetermined "acquisition-check" period.

The third predetermined "acquisition-check" period may be short, e.g. less than 0.1 s, less than 0.05 s, or less than 0.02 s less than 1 ms, less than 0.5 ms, or less than 0.25 ms.

If no message is received on the acquisition channel during the third predetermined "acquisition-check" period, the method may comprise returning to the inactive mode. If a message is received from an unsynchronised device, the method may comprise remaining active in the fourth predetermined "pairing" period and providing data to the unsynchronised device so that the unsynchronised device can join the mesh network.

The fourth predetermined "pairing" period may be less than 0.5 s, less than 0.2 s, or less than 0.05 s. The first predetermined "wake-up" period, the second predetermined "message forwarding" period, the third predetermined "acquisition-check" period and the fourth predetermined "pairing" period may, in total be no more than 1 second or no more than 0.5 seconds. This can allow synchronisation, or the transmission of a message to the controller and back to occur in a single channel. Of course, it is also possible for the synchronisation or transmission and acknowledgement to occur over a longer period in more than one channel.

The method may comprise sending a request to join the network and requesting data comprising the current channel in the frequency hopping sequence and the time left in that channel.

The method may comprise transmitting data (optionally in response to a request) comprising the current channel in the frequency hopping sequence and the time left in that channel to an unsynchronised device.

Obviously the mesh networked device of the second aspect of the invention may be operable to carry out the method of the fourth aspect of the invention, including any optional features.

Indeed, any features defined herein may be combined with any other features, unless they are mutually exclusive, regardless of whether such combined features are defined in relation to still further features; that is to say, optional/preferred features can be combined without necessarily also including the all the features of the statements of invention to which they refer—likewise, any features of the specific description may be combined in new claims.

DETAILED DESCRIPTION OF THE INVENTION

In order that the invention may be more clearly understood, embodiments thereof will now be described, by way of example only, with reference to the accompanying drawings, of which:

Figure 1:
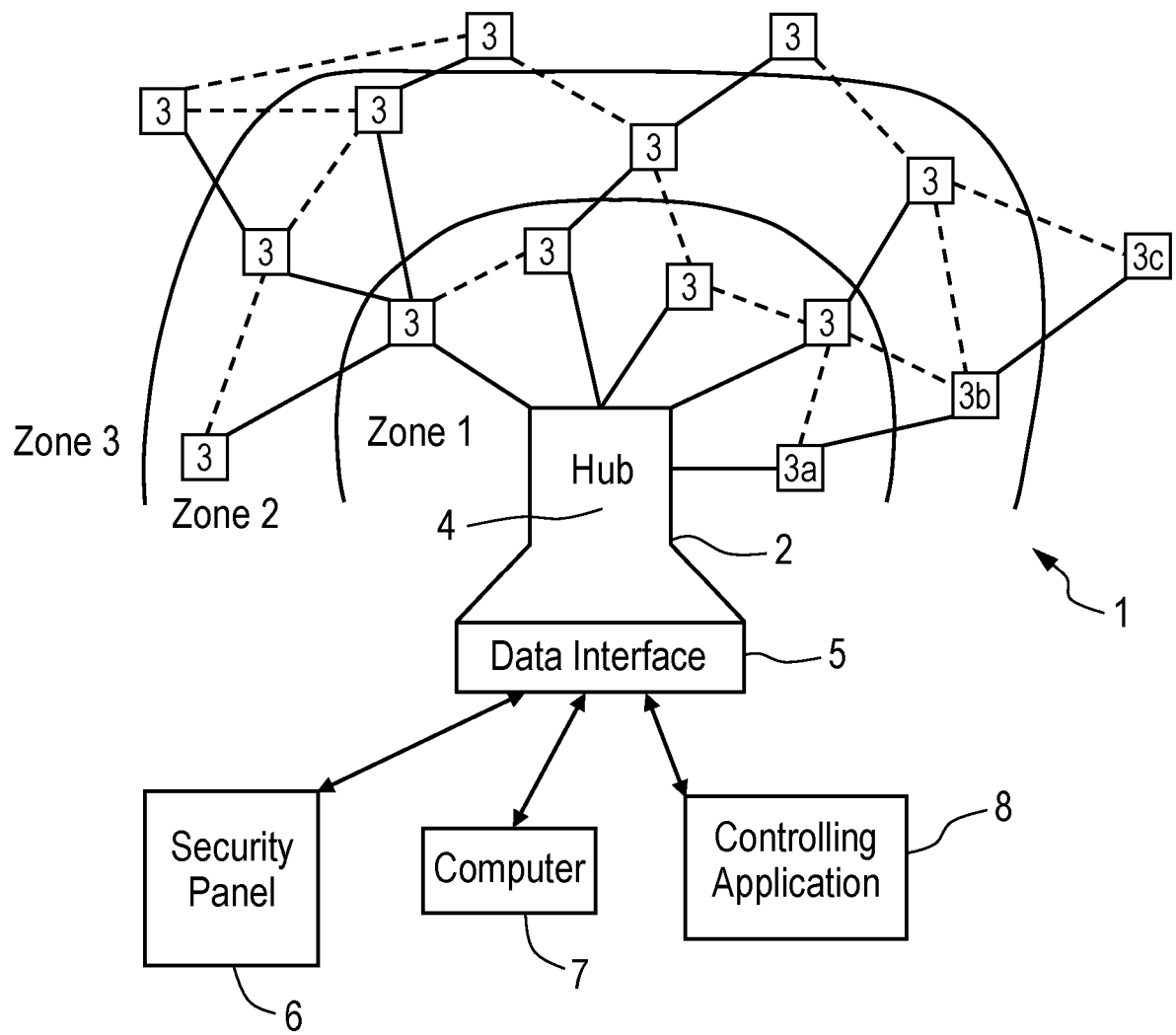
FIG. 1 is a schematic diagram of a mesh-network in accordance with the invention.

With reference to the figures, in particular FIG. 1, an exemplary mesh network 1 in accordance with the invention is shown. The mesh network 1 is described in the context of an alarm system, but those skilled in the art will appreciate that the invention could be used in numerous other applications.

The mesh network 1 comprises a controller 2 and a series of mesh-networked devices 3, or nodes. The mesh-networked devices 3 are arranged in a series of zones on the basis of the minimum number of devices required to forward a message from them to the controller 2. Thus, a zone 1 device 3 can communicate directly with the controller 2, a zone 2 device 3 can only communicate with the controller 2 via at least one other (zone 1) mesh networked device, and a zone 3 device 3 can only communicate with the controller 2 via at least two other mesh networked devices 3 (one in zone 2 and the other in zone 1).

A mesh network 1 is a network topology in which each node relays data for the network. All mesh-networked devices 3 cooperate in the distribution of data in the network.

The mesh-network 1 of the invention uses a routing technique to propagate messages between the controller and the mesh-networked devices.

In this embodiment, messages are sent along the routes requiring the lowest number of re-transmissions—hence, in the figure each node 3 in zone 2 or 3 is connected to a node in a more inward zone (zone 1 or 2) with a full line, indicating a preferred route. Dotted lines are also shown, indicating where signal strength is sufficient for communication with other nodes, but routes along dotted lines will not be used unless a preferred route fails and the mesh network self-heals.

The controller 2 includes a hub 4, which controls the mesh-networked devices 3, receiving periodic poll messages from them, to check that they are functional, arming them, and receiving messages from them concerning changes in status, e.g. sensor data, which are of course generated randomly.

The controller 2 also includes a data interface 5, through which it communicates with a security panel 6, computer 7, controlling application 8 (e.g. on a smartphone or the like), in order to communicate with a user, e.g. so as to receive arm/disarm signals via any of the security panel 6, computer 7, controlling application 8 (e.g. on a smartphone or the like), and to send alerts to a user via the same devices, or via the devices to other parties (such as through the security panel to the police force, or a private security company, or to an external sounder, not shown).

Figure 2:
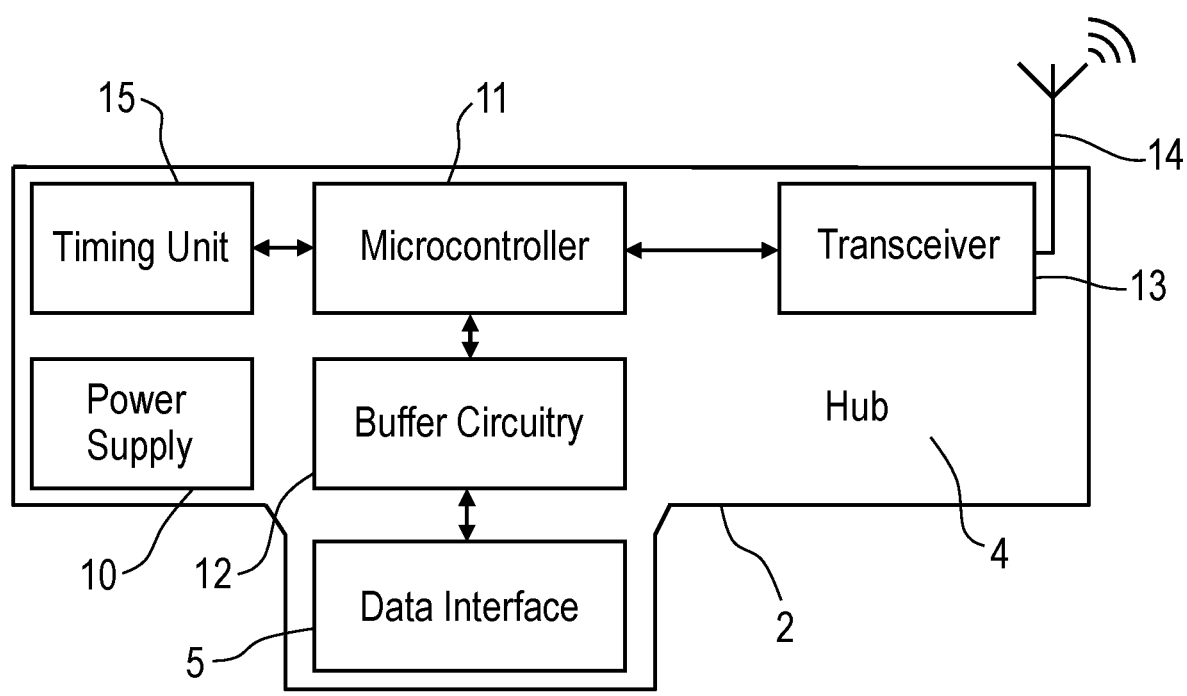
FIG. 2 is a schematic diagram of a controller of the mesh network of FIG. 1.

As shown in FIG. 2, the hub 4 of the controller 2 comprises a power supply 10, typically an external power supply, with in-built backup batteries/capacitors, a microcontroller 11, programmed to process signals received and sent by the controller 2, and buffer circuitry 12, through which the hub 4 outputs signals to, and receives signals from the data interface 5.

Additionally, the hub 4 comprises a transceiver 13, through which (via antenna 14) the controller sends and receives signals so as to exchange messages with the mesh-networked devices 3. The microcontroller 11 is also connected to a timing unit 15, which includes a watch crystal, so as to maintain a master clock.

Figure 3:
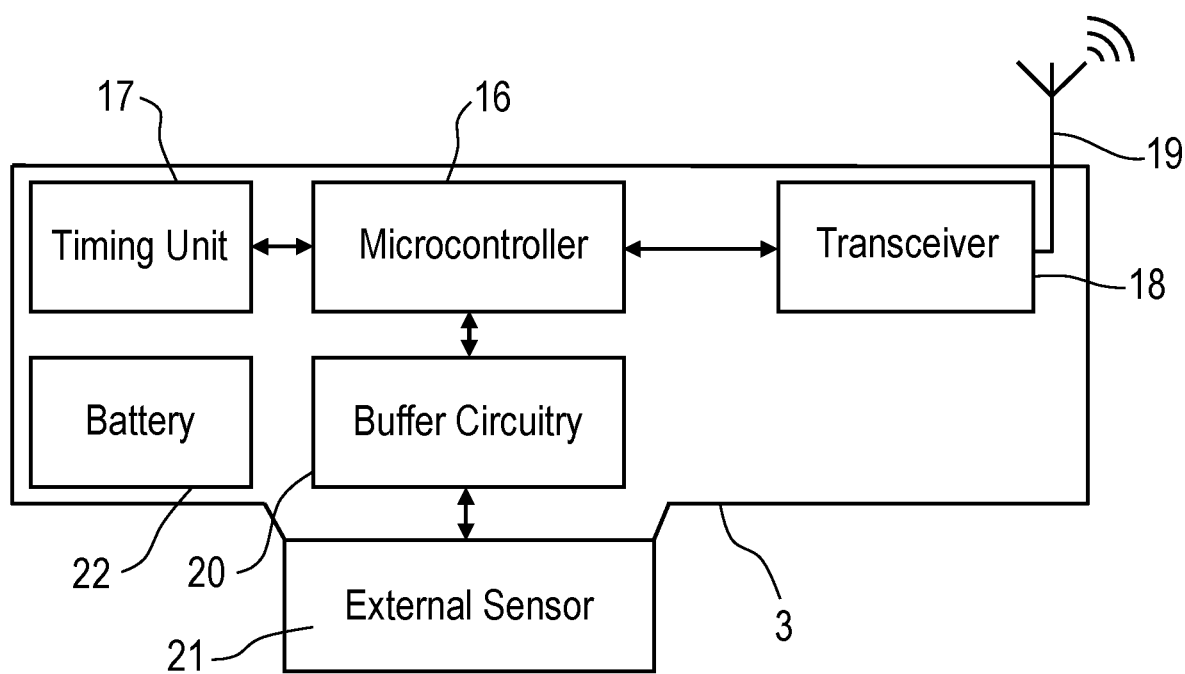
FIG. 3 is a schematic diagram of a mesh-networked device of FIG. 1.

Like the controller 2, the mesh-networked devices 3, shown in FIG. 3, comprise a microcontroller 16 to process signals sent and received by the mesh-networked device, a timing unit 17 including a watch crystal, in order to independently maintain time, and a transceiver 18 through which (via antenna 19) the mesh-networked devices 3 send and receive signals so as to exchange messages with other mesh-networked devices 3 and/or the controller 2. Like the controller 2, the mesh-networked devices 3 have buffer circuitry 20, but in this instance, the buffer circuitry is provided to interpret signals received from a sensor 21, such as a light sensor, door sensor, or the like.

The mesh-networked devices 3 of this embodiment of the invention are battery-powered wireless devices, hence, whereas the controller 2 is provided with a battery-backed up external power supply, the mesh-networked devices 3 comprise batteries 22. Provision of battery power, rather than external power, makes setting up a mesh-network 1 (i.e. installing the mesh-networked devices 3) much more straightforward, but means that low power consumption is highly desirable.

The mesh-network 1 of the invention is arranged to communicate using a frequency hopping spread spectrum (FHSS) communication technique. Accordingly, the microcontrollers 11, 16 of the controller 2 and the mesh-networked devices 3 are programmed to switch between different channels according to a sequence which is the same for every mesh networked device 3 in the mesh network 1 and for the controller 2. The devices 3 and the controller 2 switch between channels after a predetermined time interval (which may for example be the maximum period permitted in a single channel according to e.g. FCC regulations).

The frequency hopping sequence may be cyclic. For the sake of explanation, the frequency hopping sequence in the embodiment of the invention is cyclic and consecutive, hopping to the next consecutive channel up after a predetermined time interval.

Figure 4:
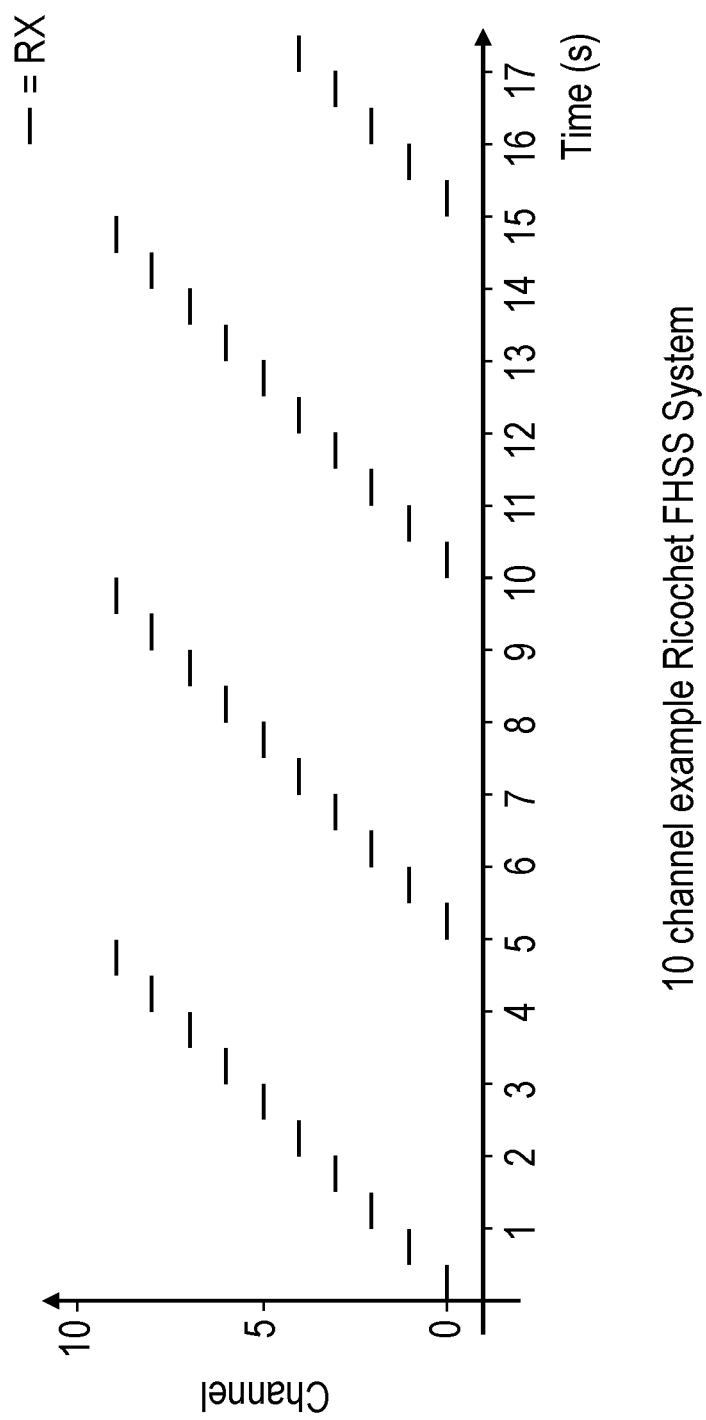
FIG. 4 is a graph showing movement between frequency channels over time in the mesh network according to FIG. 1.

FIG. 4 shows a first example of an arrangement of the mesh-network 1 of the invention, in which each mesh-networked device 3 and the controller are operable to switch between 10 frequency channels. The example shown switches cycles through every channel from Ch0 to Ch9 spending 0.5 seconds in each channel and returning to channel Ch0 after 5 seconds, to repeat the cycle.

It is more typical to use a larger number of channels, thus, a second example described with reference to FIG. 5 relates to a 50-channel system. In this system, again, it can be seen that each mesh-networked device, and the controller cycles through each channel starting at channel Ch0 at time T0. The timing units 17 of all the mesh-networked devices 3 are synchronised to the same master clock held in the timing unit 15 of the controller 2, so time T0 is the same for all devices, and the devices all cycle through, channels consecutively, spending 0.5 seconds in each channel and therefore returning to channel Ch0 after 25 seconds, 50 seconds, 75 seconds and so on. Of course, those skilled in the art will appreciate that the microcontrollers could incorporate integrated timing units, which could keep time on the basis of associated watch crystals.

Figure 5A:
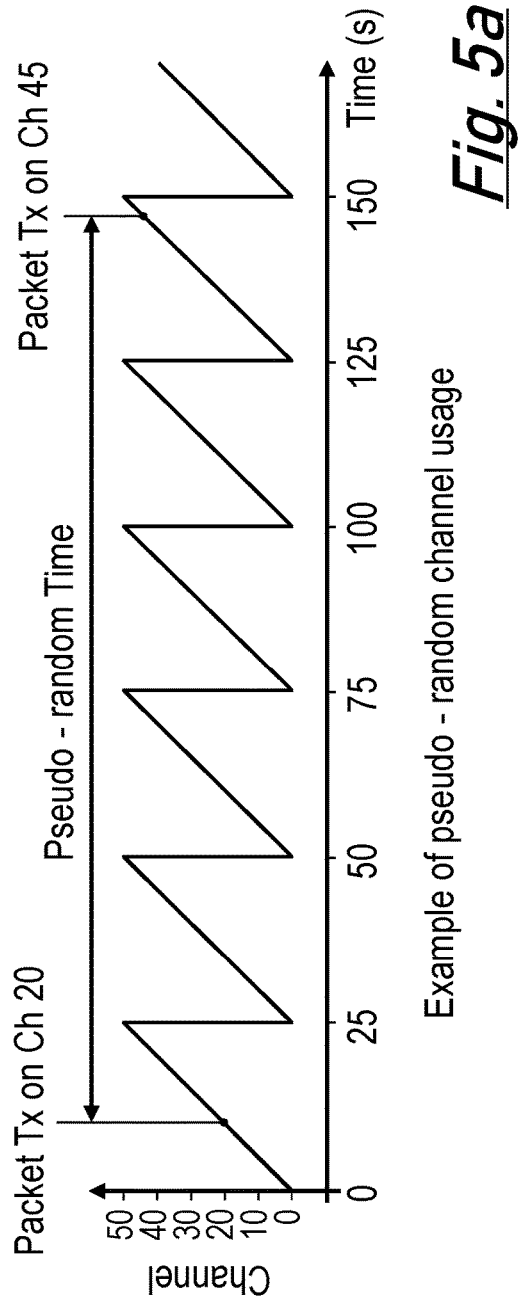
FIGS. 5a and 5b are graphs showing transmissions between devices in the mesh network of FIG. 1.

FIG. 5*a* illustrates a first message transmission being sent from a first mesh-networked device 3 after 10 seconds, which is therefore sent on channel Ch20, and will therefore be received by another mesh-networked device 3 and/or the controller 2 since it will also have switched to channel Ch20 to receive (since 10 seconds have passed since T0 and it will have incremented one channel every 0.5 seconds). After a pseudorandom time interval, a second data packet transmission is sent from the first mesh networked device 3. In this example, the pseudorandom time interval is 137.5 seconds later (at 147.5 seconds from T0), so the devices have completed 5 complete cycles through all 50 channels (over the space of 125 seconds) and have incremented a further 25 channels over the additional 12.5 seconds.

To those outside the system, the choice of channel Ch45 for the second message appears random and unpredictable, since without any knowledge of the frequency hopping sequence (in terms of either the order in which the channels are hopped through, or the duration in each channel), it is impossible to tell why after 137.5 seconds the transmission is on channel Ch45. It is likewise impossible to tell why the second transmission occurred after 137.5 seconds.

The provision of a frequency hopping cycle that is completed over a much shorter period than the pseudorandom time interval also makes it difficult, if not impossible for a hacker, to work out the cycle and follow it.

Figure 5B:
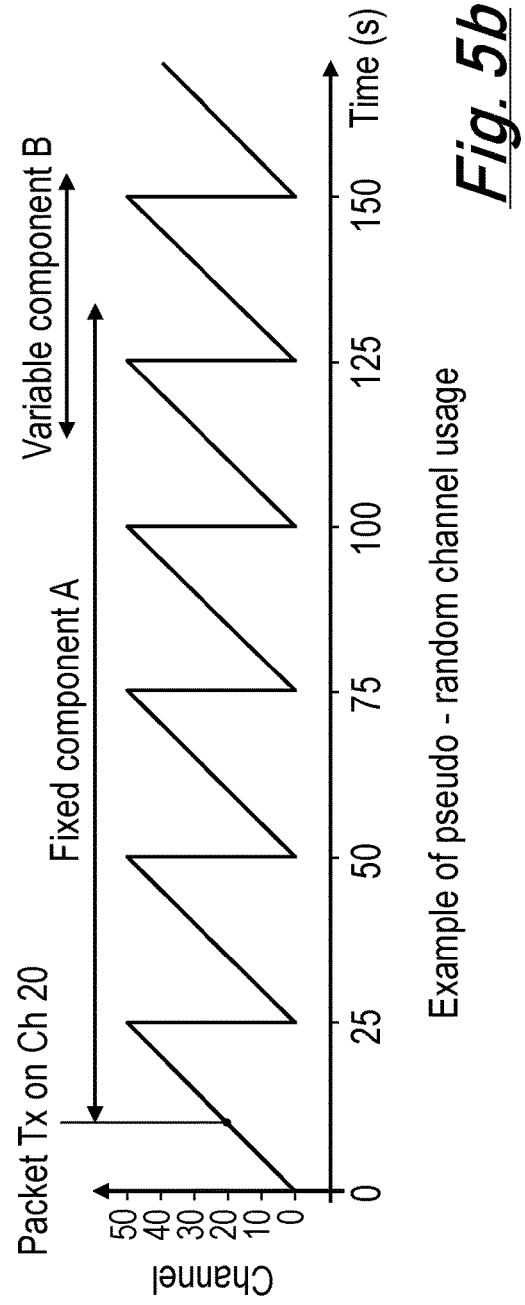

As shown in FIG. 5*b*, in one example, the pseudorandom time interval has a fixed component A having a period in this particular example of 125 seconds and a pseudorandom variable component B, in this embodiment of +/−20 seconds. The result is the same as a pseudorandom time interval having only a pseudorandom component, but with that component having a lower threshold of 105 seconds and an upper threshold of 145 seconds.

In practice, the fixed component A, or lower threshold should be set as high as possible for minimum power usage, and that time period will depend on the particular usage. In an alarm system, a time period of up to 15 minutes between polls is conceivable. If the pseudorandom component B (or the upper threshold minus the lower threshold) is set as low as possible whilst being at least equal to the length of a complete cycle of the sequence (25 seconds in a 50-channel system which spends 0.5 seconds in each channel), to a hacker, the system may even appear to be regular, but with an error margin (of +/−12.5 s in this example).

Figure 6:
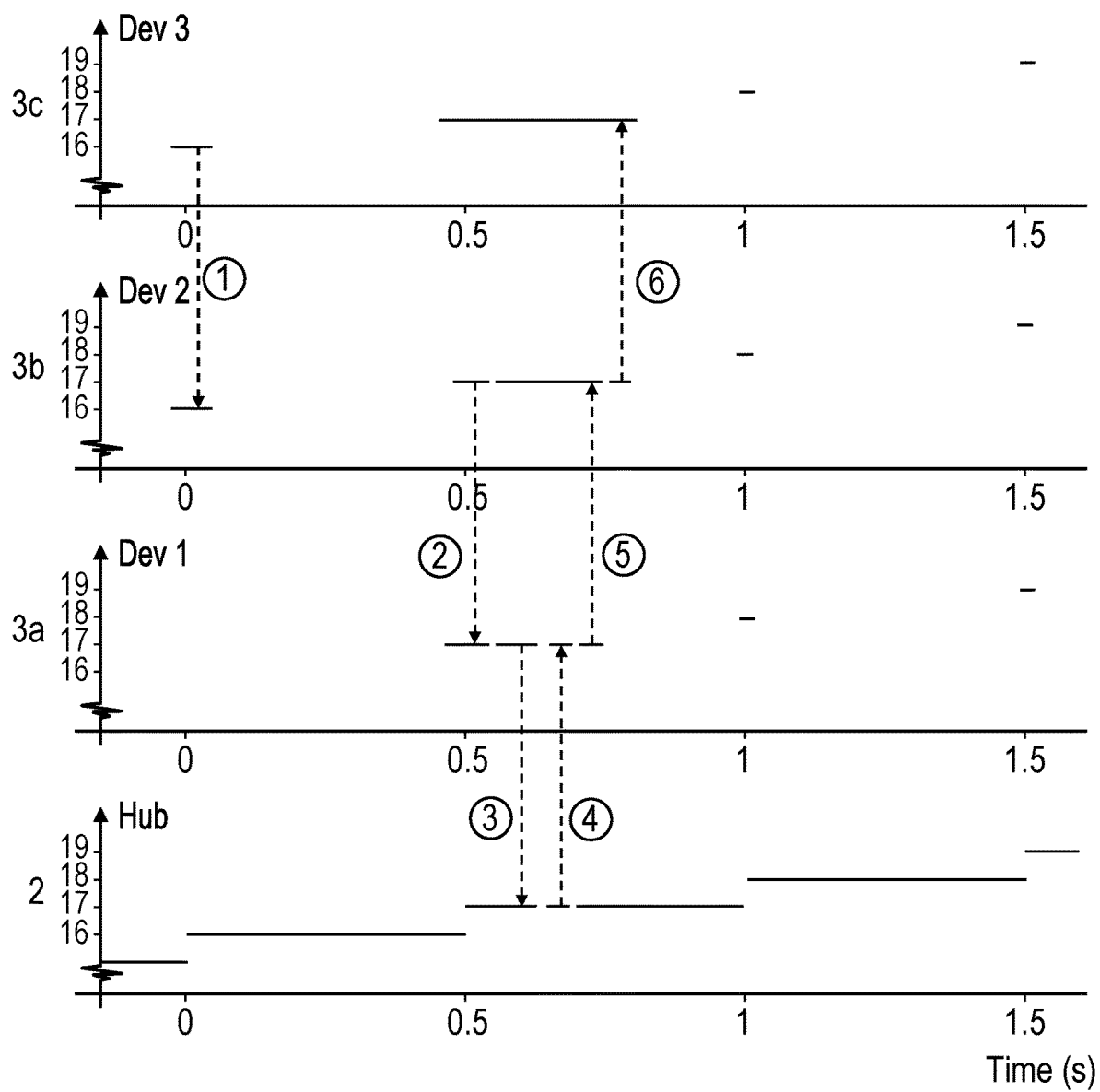
FIG. 6 is another graph showing transmissions between devices and the controller in the mesh network of FIG. 1.

FIG. 6 illustrates the successful transmission of a message in accordance with the second example discussed above. The message is an information-message containing information, for example a status-update, e.g. indicating that the device is armed, from a zone 3 mesh-network device 3 to the controller 2; FIG. 6 also illustrates the return of an acknowledgement message. The message will include the address, or another identifier for the originating device 3, so that the controller knows which device sent it and has an address to send an acknowledgement.

Whilst all the devices 3 of this embodiment have the same construction, in this example, a device in zone 1 is indicated 3a, a device in zone 2 is indicated 3b and a device in zone 3 is indicated 3c.

In this example, a pseudorandom time after the last message was sent/received, but immediately after switching to a new channel, a zone 3 device 3c turns to an active state and sends an information message to a zone 2 mesh-networked device 3b in channel Ch16, that being the channel dictated by the frequency hopping sequence at that point in time. Since all the timing units 15, 17 are synchronised, the zone 2 mesh-networked device 3b is also active at the moment that it switches channels and listening on channel Ch16 and receives the message from the zone 3 device 3c. Having begun to receive a message in the first predetermined "wake-up" period after switching on (i.e. having received the preamble) the zone 2 device remains active for a second predetermined "message forwarding" period, until it has received the full message. Each mesh network device 3 is operable to remain in the receive mode only for a brief first predetermined "wake-up" period of 0.5 ms if it does not receive a message, so the zone 2 mesh network device 3b does not immediately send on the message to the zone 1 mesh network device 3a, because the message is about 50 ms (i.e. 0.05s) long and the zone 1 device 3a will have turned to the receive mode, received nothing and returned to its inactive state by the time the message is received by the zone 2 device 3b. Accordingly, the zone 2 device 3b sends the message to the zone 1 device 3a when they are both arranged to next listen, in the next channel, i.e. in channel Ch17, half a second after they last woke up.

Having forwarded a message, the zone 3 device 3c is operable to remain in the active state, in the receive mode when it becomes active in the next channel Ch17, in order to await an acknowledgement. Similarly, after forwarding the message to the zone 1 device 3a, the zone 2 device 3b remains in the receive mode, awaiting an acknowledgement.

Having received the message from the zone 2 device 3b, the zone 1 device 3a forwards it to the controller 2. The controller 2 is always active, either in the transmit mode or the receive mode, since it has an external power source 10 and does not need to conserve energy. Consequently, the zone 1 device sends on the message, even though the first predetermined "wake-up" period (of 0.5 ms) has expired, and remains active to receive an acknowledgement.

The controller 2 processes the message and prepares an acknowledgement with appropriate instructions. The acknowledgement message comprises an indication of the channel that the controller 2 is using and the time remaining in that channel. The zone 1 device 3a receives the acknowledgement message and immediately forwards it on to the zone 2 device 3b, also providing an indication of the channel that it (the zone 1 device 3a) is in, and how long is left in that channel. The zone 1 device 3a compares the time that the controller 2 has left in the channel with the time it has left in the channel and synchronises its clock 17 if necessary (i.e. if the times do not match, or are outside an error margin, e.g. 2 ms). It then switches to the inactive state.

The zone 2 device 3b has remained active, so it receives the acknowledgement message on channel Ch17 and immediately forwards it on to the zone 3 device 3c, also adding to the message an indication of the channel that it (the zone 2 device 3b) is in and the length of time left in that channel Ch17. The zone 2 device 3b compares the time that the zone 1 device 3a and/or the controller 2 has left in its channel Ch17 with the time it has left in the channel Ch 17 and synchronises its timing unit 17 if necessary (i.e. if the times do not match, or are outside an error margin, e.g. 2 ms). It then switches to the inactive state.

The zone 3 device 3c has remained active, so it receives the acknowledgement message on channel Ch17 and takes any necessary action as dictated in the message from the controller 2. It also compares the time that the zone 2 device 3b and/or the controller 2 has left in its channel with the time it has left in the channel and synchronises its timing unit 17 if necessary (i.e. if the times do not match, or are outside an error margin, e.g. 2 ms). It then switches to the inactive state.

A third example of a manner of operation of the mesh network 1 in accordance with the invention is described with reference to FIG. 7. In this example, in addition to sending messages in accordance with the method set out in the second example, whereby channels are cycled through and a receive mode entered in a new channel every 0.5 s and messages transmitted at pseudorandom time intervals, each mesh-networked device 3, and the controller 2 listens on an acquisition channel, Ch0 for any unsynchronised mesh-network devices 3 which wish to join the mesh network 1.

Figure 7:
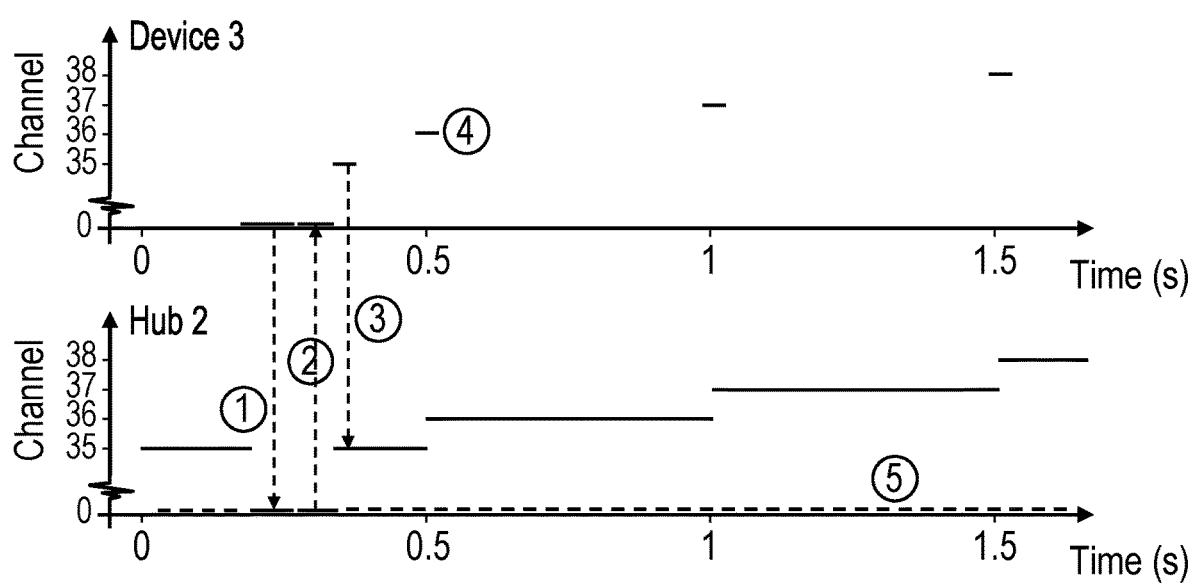
FIG. 7 is another graph showing transmissions between a device and the controller in the mesh network of FIG. 1.

FIG. 7 shows only a controller 2 and a single device 3 within range of the controller 2.

In this example, the controller 2 is operated to listen (i.e. to receive) on channel Ch0 every 0.05 s, as it is externally powered. On the other hand, the mesh networked devices 3, only listen on channel Ch0 each time they become active and enter the receive mode (each time they change channel according to the frequency hopping sequence), and transmit on channel Ch0 whenever they are unsynchronised; transmitting a message with a request to join, in order to join the mesh-network 1. In this example, the controller is at channel Ch35 in the cycle through the frequency hopping sequence, when it receives a signal on channel Ch0.

In this example, the unsynchronised mesh-networkable device 3 is switched on at 0.175 s and immediately sends a request on channel Ch0 to join the network, then remains in receive mode on channel Ch0 awaiting a response. This request is received the next time the controller 2 is set to receive on channel Ch0, i.e. at 0.2 s. Having received the join request from mesh-networkable device 3, the controller 2 verifies that the mesh-networkable device 3 is a mesh-networkable device intended for the system, by comparing an ID number, for example, and having verified the mesh-networkable device 3, the controller 2 sends an acknowledgement message on channel Ch0 which once again comprises an indication of the channel that is being used (Ch35) and the length of time left in that channel.

On receipt of that acknowledgement message the mesh-networkable device 3 configures itself, setting the timing unit 17 according to the time left in the channel and setting the position in the frequency hopping sequence stored in the device 3 to the channel Ch35 indicated by the controller 2. The mesh-networked device 3 then sends a confirmation message on the correct channel 35 in the frequency hopping sequence confirming that it is synchronised in time and frequency.

Now that the mesh-networked device 3 is synchronised in time and frequency, it will follow the frequency hopping sequence, and therefore be on the same channel at the same time as all the other mesh-networked devices 3 in the mesh-network 1 (which follow the same frequency hopping sequence), in this example, hopping to (and entering the receive mode on) Channel Ch36 at T=0.5 s, to Channel 37 at T=1 s and so on. In consequence, it can exchange messages with other mesh-networked devices 3 that are within range, as well as with the controller 2, and is therefore integrated into the mesh network 1.

Figure 8:
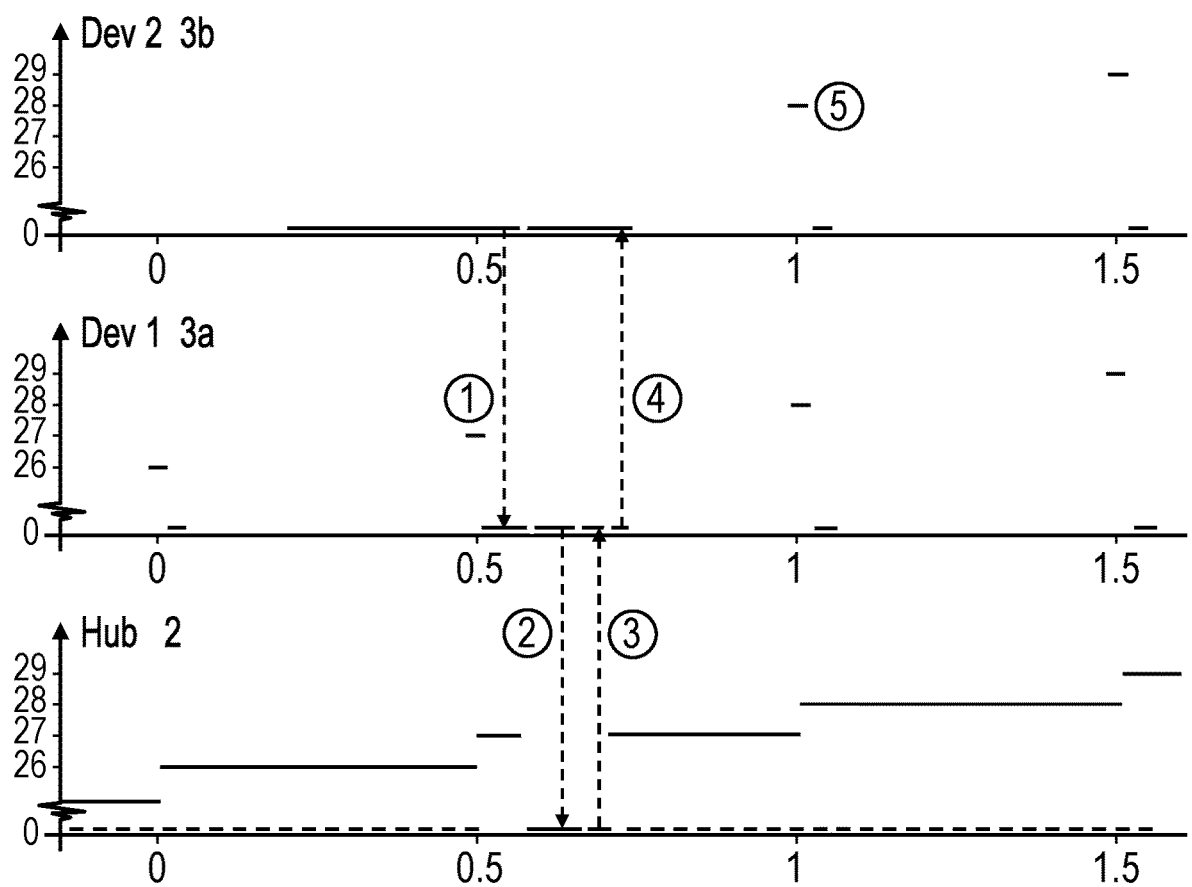
FIG. 8 is yet another graph showing transmissions between devices and the controller in the mesh network of FIG. 1.

Another example of the way the mesh network 1 operates to synchronise mesh-networked devices 3 is described with reference to FIG. 8. In this example, a device 3*b* in zone 2 has become unsynchronised, for example because its battery 22 has been replaced (the same technique would work for a new device 3 joining in zone 2). Again in this example, the mesh network 1 (including the controller 2 and all mesh-networked devices 3) are operable to use an acquisition channel Ch0, in addition to the channels Ch 1-49, used for communication at pseudorandom intervals.

The mesh networked zone 1 device (3*a*) and the controller 2 are working as normal, with the mesh-networked device 3*a* switching channels in sequence, entering the receive mode briefly and switching to an inactive state when no message is received; the mesh networked device 3*a*, as alluded to earlier, also listens on the acquisition channel Ch0 each time it is active, after listening on the predetermined channel in the sequence and before becoming inactive. In this example, at T0, the mesh-networked zone 1 device 3*a* and the controller 2 are in channel Ch26. The graph starts shortly before the device 3*b* in zone 2 is turned on, so having heard nothing in either Ch0 or Ch26, the device 3*a* becomes inactive after 1 ms (0.5 ms in Ch26 and 0.5 ms in Ch0). The controller remains active, switching frequently between Ch26 and Ch0 listening for messages.

When the unsynchronised mesh networkable device 3*b* is switched on (at T=0.2 s), it immediately transmits on Ch0, sending a request to join the network 1. As the device is outside the range of the controller 2, this message is not received by the controller 2, although it is listening on Ch0. Thus, it is only at T=0.5005 s when the Zone 1 device 3*a* has woken up, listened in channel Ch27 (the next in the sequence) and switched to the acquisition channel Ch0, that the message from the unsynchronised zone 2 device 3*b* is received by the zone 1 device 3*a*. Having received the message, the zone 1 device, forwards it to the controller 2 on channel Ch0 (of course, the mesh networked device 3*a* could instead use the channel Ch27 in the sequence, knowing that the controller will be listening in that channel (Ch27) too). The controller 2 verifies that the zone 2 device 3*b* that has become unsynchronised is a mesh-networkable device 3 according to the system and sends an acknowledgment on Channel Ch0 destined for the zone 2 device 3*b* (addressed to it) comprising the details of the current channel Ch27 and the amount of time left in the channel Ch27. The zone 1 device 3*a*, receives the acknowledgement and forwards it on to the zone 2 device 3*b*. The zone 2 device 3*b* is therefore able to update its internal clock 17 and become synchronised to the mesh network 1. Now that the zone 2 device 3*b* has become a synchronised mesh-network device 3, it is able to communicate with the other devices 3 in the mesh network 1, to follow the sequence, receiving communications from other devices 3 on the correct channel in the sequence at the correct time, and transmitting messages (for example including sensor data or status data) at pseudorandom intervals on the correct channel.

Of course, the discussions above are generally concerned with transmission of non-time-sensitive polling-type messages, in which nodes "check-in". However, especially in the context of a mesh-networked alarm system, it is to be expected that additionally to the messages which are not time-sensitive and are sent at pseudorandom intervals, there will be further alarm messages, generated at random times (when a sensor is triggered), which will of course be forwarded straight away, without waiting for a predetermined pseudorandom time interval. Instead, alarm messages will be sent in the appropriate channel at the time when the mesh network devices wake up. For example, if the channel is say CH30 and the first predetermined "wake-up" period for receiving messages has expired in that channel, the alarm message will be sent in the next channel in the sequence, CH31, during the next first predetermined "wake-up" period, when each mesh networked device 3 turns to an active state to receive messages.

Indeed, those skilled in the art may envisage other situations where a time-sensitive message must be sent as soon as possible (i.e. at the next moment that it will be received), and it is envisaged that the invention, (also including certain messages which are only sent at pseudorandom time intervals), will be included in such systems.

The above embodiments are described by way of example only. Many variations are possible without departing from the scope of the invention.

The invention claimed is:

1. A mesh network comprising a controller and a plurality of mesh-networked devices, operable to communicate with the controller; the controller and the plurality of mesh-networked devices comprising timing units, and being operable to communicate in accordance with a frequency hopping sequence; wherein the mesh-networked devices are operable to switch between a transmit mode, in which they are capable of transmitting messages to one or more other mesh-networked device and/or the controller and an inactive mode, in which they are unable to transmit to or receive messages from one or more other mesh-networked devices or the controller; wherein the timing units of the mesh-networked devices are synchronised and the mesh-networked devices are operable to switch to the transmit mode at time intervals having a pseudorandom component.

2. A mesh network according to claim 1 wherein the mesh-networked devices are operable to switch between the transmit mode, the inactive mode and a receive mode, in which they are capable of receiving messages from one or more other mesh-networked device and/or the controller.

3. A mesh network according to claim 2 wherein the mesh-networked devices are operable to switch to the receive mode in accordance with the frequency hopping sequence.

4. A mesh network according to claim 2 wherein the time intervals having a pseudorandom component are synchronised to occur when other mesh network devices are in the receive mode.

5. A mesh network according to claim 2 wherein the mesh-networked devices switch to the receive mode each time they change frequency channel.

6. A mesh network according to claim 2 wherein the plurality of mesh-networked devices are operable to switch to the receive mode and remain in a receive mode for a first predetermined "wake-up" period, and if no message is received within that period, to return to the inactive mode.

7. A mesh network according to claim 1 wherein the time in each channel in the frequency hopping sequence is identical.

8. A mesh network according to claim 7 wherein the frequency hopping sequence is cyclic.

9. A mesh network according to claim 8 wherein the frequency hopping sequence is cyclic and consecutive.

10. A mesh network according to claim 1 wherein the time in each channel in the frequency hopping sequence is at least 10 times shorter, at least 50 times shorter, at least 100 times shorter, or at least 200 times shorter than an average time interval having a pseudorandom component.

11. A mesh network according to claim 1 wherein the mesh-networked devices are operable to send acknowledgement messages comprising the current frequency channel and time left in the channel.

12. A mesh network according to claim 1 wherein the mesh-networked devices are battery powered.

13. A mesh network according to claim 1 wherein the plurality of mesh-networked devices, are operable to communicate in accordance with a frequency hopping sequence; wherein the mesh-networked devices are arranged to switch to a receive mode for a first predetermined "wake-up" period and remain active in a receive and/or transmit mode for a second predetermined "message forwarding" period in a channel according to the sequence and switch to a receive mode for a third predetermined "acquisition-check" period and remain active in a receive and/or transmit mode for a fourth predetermined "pairing" period in at least one other predetermined acquisition channel; wherein the acquisition channel is a channel specifically used to add devices to the mesh network and each time a mesh-networked device switches to an active mode, each mesh-networked device is operable to first listen for any messages in the channel according to the frequency hopping sequence, and if a message is received, remain active to transfer it, and forward on an acknowledgement; then, once the first predetermined "wake-up" period has passed and the second predetermined "message forwarding" period, if a message is received, has passed the device is operable to switch to the acquisition channel for a third predetermined "acquisition-check" period.

14. A mesh-networkable device for use in a mesh network comprising a controller and a plurality of mesh-networked devices, operable to communicate with the controller; mesh-networkable device comprising a timing unit, and being operable to communicate in accordance with a frequency hopping sequence; wherein the mesh-networkable device is operable to switch between a transmit mode, in it is are capable of transmitting messages to one or more other mesh-networked device and/or the controller and an inactive mode, in which it is unable to transmit to or receive messages from one or more other mesh-networked devices or the controller; wherein the mesh-networkable device is operable to synchronise its timing unit to the mesh-networked devices and/or the controller and operable to switch to the transmit mode at time intervals having a pseudorandom component.

15. A controller for controlling mesh-networked devices in a mesh network; the controller comprising a timing unit, and being operable to communicate in accordance with a frequency hopping sequence; wherein the mesh-networked devices are operable to switch between a transmit mode, in which they are capable of transmitting messages to one or more other mesh-networked device and/or the controller and an inactive mode, in which they are unable to transmit to or receive messages from one or more other mesh-networked devices or the controller; wherein the controller is operable to synchronise the timing units of the mesh-networked devices to its timing unit such that the mesh-networked devices are operable to switch to the transmit mode at synchronised time intervals having a pseudorandom component.

16. A controller according to claim 15 which is operable to transmit messages comprising data including the length of time left in the channel in the frequency hopping sequence.

17. A method of operating a mesh-networked device to transmit data in a mesh network comprising a controller and a plurality of mesh-networked devices, operable to communicate with the controller; the method comprising communicating in accordance with a frequency hopping sequence; whereby the mesh-networked device switches between a transmit mode, in which it is capable of transmitting messages to one or more other mesh-networked device and/or the controller and an inactive mode, in which it is unable to transmit to or receive messages from one or more other mesh-networked devices or the controller; the method further comprising synchronising a timing units of the mesh-networked device with timing units of other mesh-networked devices and/or the controller and comprising switching to the transmit mode at time intervals having a pseudorandom component.

18. A method according to claim 17 comprising switching between the transmit mode, the inactive mode and a receive mode, in which the mesh-networked device is capable of receiving messages from one or more other mesh-networked devices and/or the controller; and further comprising switching to the receive mode in accordance with the frequency hopping sequence.

19. A method according to claim 17 comprising transmitting at time intervals having a pseudorandom component which are be synchronised to occur when other mesh network devices are in the receive mode.

20. A method according to claim 17 comprising calculating the time intervals having a pseudorandom component such that they are always a multiple of the length of time spent in each channel, such that they always end when the channel changes.

* * * * *